United States Patent
Talty et al.

(10) Patent No.: US 10,511,335 B2
(45) Date of Patent: Dec. 17, 2019

(54) METHOD AND APPARATUS FOR ADJACENT BAND RF SIGNAL RECEPTION

(71) Applicant: GM GLOBAL TECHNOLOGY OPERATIONS LLC, Detroit, MI (US)

(72) Inventors: Timothy J. Talty, Beverly Hills, MI (US); Duane S. Carper, Davison, MI (US); Eray Yasan, Canton, MI (US); David M. George, Farmington Hills, MI (US); James H. Schaffner, Chatsworth, CA (US); Hyok Jae Song, Oak Park, CA (US); Walter S. Wall, Santa Monica, CA (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/600,002

(22) Filed: May 19, 2017

(65) Prior Publication Data
US 2018/0337696 A1 Nov. 22, 2018

(51) Int. Cl.
*H04B 1/00* (2006.01)
*H04W 88/06* (2009.01)

(52) U.S. Cl.
CPC .......... *H04B 1/0053* (2013.01); *H04W 88/06* (2013.01)

(58) Field of Classification Search
CPC .................................................. H04B 1/0053
See application file for complete search history.

(56) References Cited

U.S. PATENT DOCUMENTS

| | | | | |
|---|---|---|---|---|
| 2008/0062053 A1* | 3/2008 | Marko | ................ | H01Q 1/3291 343/713 |
| 2009/0167290 A1* | 7/2009 | Brouk | ............... | H01J 37/32082 324/76.38 |
| 2013/0229315 A1* | 9/2013 | Duzdar | ................ | H01Q 1/3275 343/713 |
| 2014/0113573 A1* | 4/2014 | Khatri | .................. | H03F 1/0277 455/78 |
| 2015/0375695 A1* | 12/2015 | Grimm | .............. | G05B 19/0428 701/1 |

* cited by examiner

*Primary Examiner* — Hsinchun Liao
(74) *Attorney, Agent, or Firm* — Lorenz & Kopf, LLP

(57) ABSTRACT

A signal processing apparatus for simultaneously receiving and processing a satellite signal and a WCS signal. The system and method is operative to receive the signals, amplify and bandwidth covering both signals, splitting the amplified signal into a first and second portions, filtering the first portion to reduce the WCS signal, amplifying the first portion to amplify the satellite signal in the first portion, and processing the satellite signal in the first portion. The system and method is further operative to processing the WCS signal in the second portion.

19 Claims, 7 Drawing Sheets

METHOD AND APPARATUS FOR ADJACENT BAND RF SIGNAL RECEPTION

BACKGROUND OF THE INVENTION

Field of the Invention

This invention relates generally to a system and method for the reception of radio frequency signals using a common antenna structure wherein the radio frequency signals are transmitted at adjacent frequency bands and have disparity in signal power. In particular the system may use a single patch antenna wherein at least one of the desired signals are vertically and/or horizontally polarized and another of the desired signals is circularly polarized.

Discussion of the Related Art

Mobile wireless cellular devices are everywhere. Cellular devices allow for the wireless transmission and reception of video, audio and data, and are relied on by users for many purposes. Those purposes and the technology, such as 4G long term evolution (LTE), to provide the services are increasing, which requires an increasing need for more wireless bandwidth and data throughput. With the explosion in demand for cellular data and voice services, there is an increasing burden on the existing frequency bands allocated for these services, where the available cellular bandwidth is becoming insufficient to meet those demands. Providing additional frequency bands for cellular services has a direct and often times measurable impact on commercial progress.

The Federal Communications Commission (FCC) regulates which frequency bands are used for what purposes in the United States. Thus, there has been significant pressure on the FCC to allocate more frequency bands for cellular services, which also provides significant revenue. In response, the FCC has recently reallocated the WCS frequency band for cellular services, where the 2305-2320 MHz frequency band is now being used for signals transmitted from mobile cellular devices to a cellular tower and the 2345-2360 MHz frequency band is now being used for signals transmitted from the cellular tower to the mobile devices.

Satellite radio, specifically Sirius and XM, have also been allocated a certain frequency band by the FCC, where Sirius satellite radio operates in the 2320-2332.50 MHz frequency band and XM satellite radio operates in the 2332.50-2345 MHz frequency band. As is apparent, the XM frequency band is contiguous and adjacent to the WCS frequency band used for signals transmitted by the cellular tower and the Sirius frequency band is contiguous and adjacent to the WCS frequency band used for signals transmitted by the mobile devices.

Satellite radios receive signals from satellites from which certain audio can be played. Those signals are at relatively low power when received by the radio. Cellular towers broadcast cellular signals to the mobile wireless devices within a certain range of the tower. Those signals are broadcast at a relatively high power from the tower to be received by the mobile devices some distance away at the appropriate data rate throughput. If a vehicle having a satellite radio is travelling within a certain proximity to a cellular tower that is broadcasting cellular signals in the WCS frequency band, those signals are received by the satellite radio antenna on the vehicle at a relatively high power, for example, possibly five magnitudes larger than the satellite radio signals being received by the antenna. For XM satellite radio signals that may be directly adjacent to the WCS signals from the cellular tower, the WCS frequency signals can overwhelm and block the satellite radio signals, where the satellite radio on the vehicle may go mute.

However, since portions of the LTE band and the satellite radio bands are similar in frequency, it would be desirable to reuse some of the hardware, such as the antenna, in order to reduce footprint and redundancy.

SUMMARY OF THE INVENTION

The present invention discloses and describes a method comprising receiving a first signal and a second signal, amplifying the first signal and the second signal, coupling a first portion of the first signal and the second signal to a filter wherein the filter is operative to reduce the amplitude of the second signal to generate a first filtered signal, amplifying the first filtered signal to generate an amplified first filtered signal, processing the amplified first filtered signal to generate a first data signal, and coupling a second portion of the first signal and the second signal and processing the second signal to generate a second data signal.

Another aspect of the present disclosure describes a signal processing apparatus comprising an input for receiving a first signal and a second signal, a first amplifier for amplifying the first signal and the second signal, a signal coupler for decoupling a first portion of the first signal and the second signal to generate a first decoupled signal and a second portion of the first signal and the second signal second to generate a second decoupled signal, a filter to filter the first decoupled signal to reduce the amplitude of the portion of the second signal to generate a first filtered signal, an amplifier for amplifying the first filtered signal to generate an amplified first filtered signal, a first processor for processing the amplified first filtered signal to generate a first data signal, and a second processor for processing the second decoupled signal to generate a second data signal.

Another aspect of the present disclosure describes an apparatus comprising an antenna for receiving a satellite signal and a wireless communications signal, an first amplifier for amplifying the satellite signal and the wireless communications signal, a coupler for decoupling a first portion of the satellite signal and a first portion of the wireless communications signal to form a first signal, from a second portion of the satellite signal and a second portion of the wireless communications signal wherein the second portion of the satellite signal and the second portion of the wireless signal form a second signal, a band rejection filter for filtering the first signal in order to reduce an amplitude of the first portion of the wireless communications signal, a second amplifier for amplifying the first signal in order to increase the amplitude of the first portion of the satellite signal, a first processor for processing the first portion of the satellite signal to generate a first data signal, and a second processor for processing the second portion of the wireless communications signal to generate a second data signal.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a WCS filter system for filtering WCS signals in a satellite radio is merely exemplary in nature, and is in no way intended to limit the invention or its applications or uses. For example, as discussed herein, the satellite radio is on a vehicle. However, as will be appreciated by those skilled in the art, the satellite radio may be on other mobile platforms or otherwise.

Figure 1:
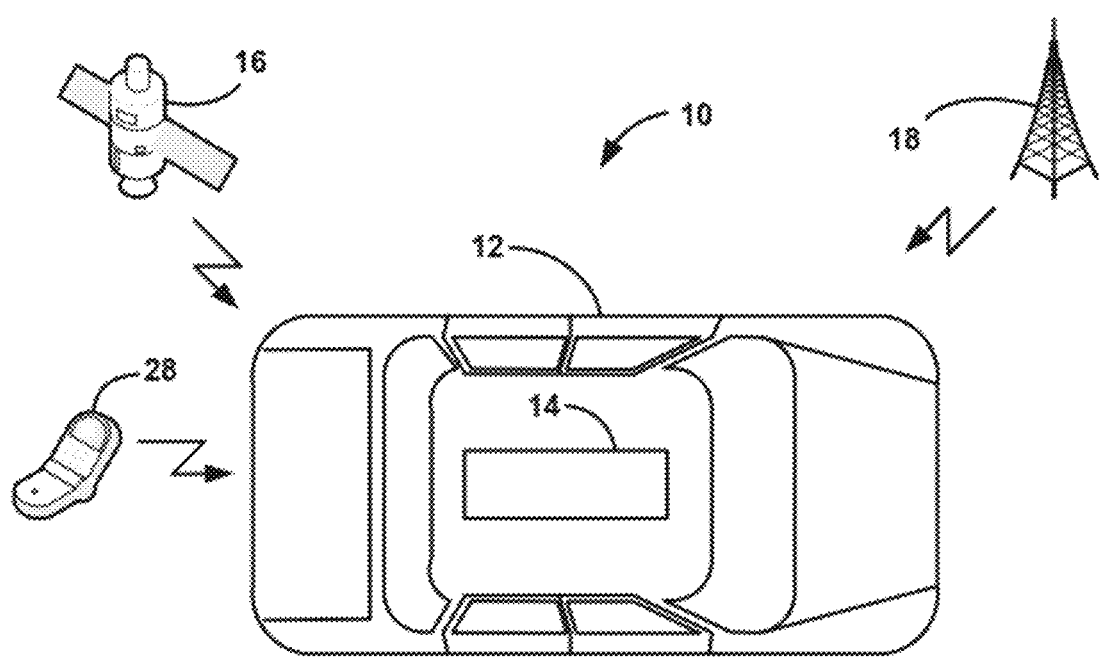
FIG. 1 is an illustration of a vehicle having a satellite radio in communication with a satellite and a cellular tower.

FIG. 1 is an illustration 10 showing a vehicle 12 having a satellite radio 14, such as an XM satellite radio or a Sirius satellite radio that receives satellite radio signals from a satellite 16. The vehicle 12 may be traveling near a cellular tower 18 that may be broadcasting cellular signals in the WCS frequency band that may be adjacent to the frequency band of the signals broadcast by the satellite 16. For example, the radio 14 may be an XM radio, the satellite 16 may be broadcasting XM signals in the 2332.50-2345 MHz frequency band, and the cellular tower 18 may be broadcasting WCS signals in the 2345-360 MHz frequency band. As discussed above, the power of the signals from the cellular tower 18 may be high enough and close enough in frequency to the signals transmitted by the satellite 16 that the satellite radio signals are overwhelmed in the radio 14 and it goes mute. The vehicle 12 may also be traveling near a mobile cellular device 28 that may be transmitting cellular signals in the WCS frequency band that also may be adjacent to the frequency band of the signals broadcast by the satellite 16, where the device 28 may be inside the vehicle 12. For example, the radio 14 may be a Sirius radio, the satellite 16 may be broadcasting Sirius signals in the 2320-2332.50 MHz frequency band, and the cellular device 28 may be transmitting WCS signals in the 2305-2320 MHz frequency band. As discussed above, the power of the signals from the cellular device 28 may be high enough and close enough in frequency to the signals transmitted by the satellite 16 that the satellite radio signals are overwhelmed in the radio 14 and it goes mute.

Figure 2:
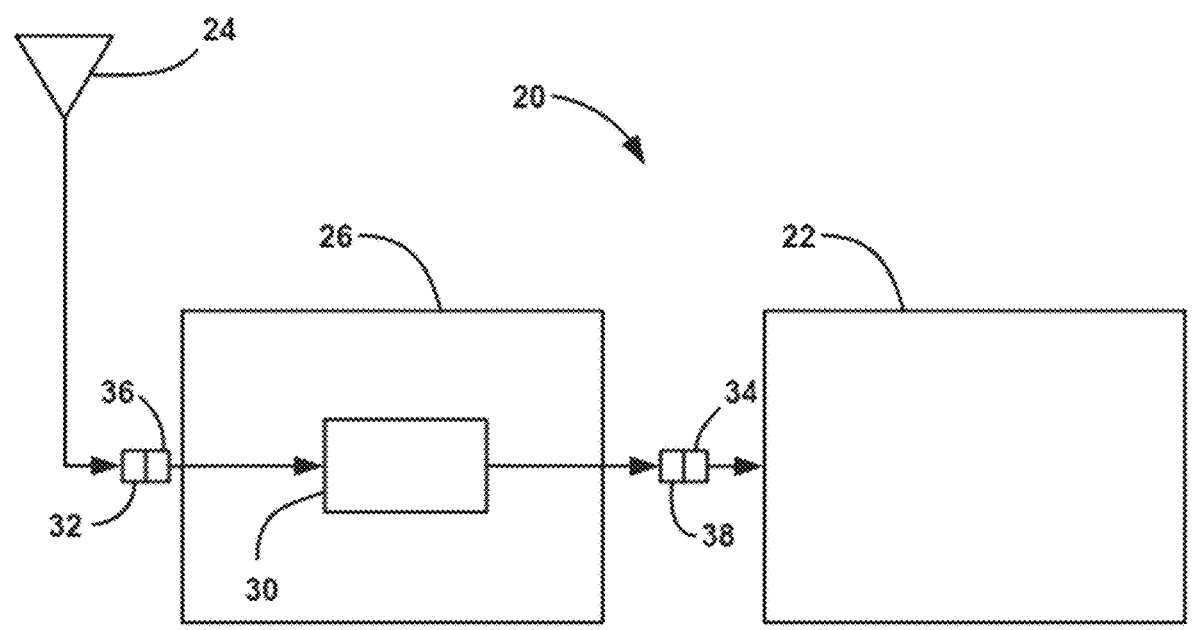
FIG. 2 is a block diagram of satellite radio including a WCS filter system.

FIG. 2 illustrates a block diagram of a satellite radio system 20 that includes a satellite radio 22 that receives satellite radio signals from, for example, the satellite 16 by an antenna 24. As is known in the art, satellite radio antennas, as well as other antennas on a vehicle, are coupled to the particular receiver/transmitter by coaxial cables, where those cables may be coupled together in sections by in-line connectors, such as FAKRA connectors, so that the vehicle can be manufactured in parts, and then assembled together by connecting the connectors. The present invention proposes inserting a WCS filter system 26 between the antenna 24 and the radio 22, where the system 26 includes, for example, a low-pass WCS filter 30 that filters out signals from the tower 18 received by the antenna 24 before they are able to be received by the radio 22. In other embodiment, the filter may be a band-pass, notch or high-pass filter consistent with the discussion herein.

In this design, an in-line coaxial connector 32 that may have previously been coupled to an in-line coaxial connector 34 to connect the antenna 24 to the radio 22 may be disconnected, and the filter system 26 is connected between the antenna 24 and the radio 22 by connecting a coaxial connector 36 to the connector 32 and a coaxial connector 38 to the connector 34 as shown, where the filter system 26 may be mounted to any suitable location on the vehicle 12. The WCS filter 30 is designed to block or reject signals above the XM frequency band so as to prevent the cellular signals transmitted by the tower 18 from being received by the radio 22. In an alternate embodiment, the filter 30 may be a high-pass filter that is designed to block WCS signals in the 2305-2320 MHz frequency band so that they do not interfere with satellite radio signals for a Sirius satellite radio. The filter 30 can be any suitable low-pass, high-pass, band-pass, notch filter for the applications discussed herein, such as filter commercially available from Quorvo™ having part number QPQ1900Q. It is noted that because the XM or Sirius frequency band and the WCS frequency band being discussed herein are adjacent, the filter 30 needs to have a narrow transition frequency band to pass the desired signals and reject the undesired signals. The WCS filter 30 may be implemented on a printed circuit board wherein the filter response one of a lowpass filter, a highpass filter, a notch filter, or a bandpass filter. By using a notch filter configuration centered at the WCS frequency may provide adequate attenuation for acceptable attenuation. The filter may be implemented using Film Bulk Acoustic Resonator (FBAR) filter technology or a Surface Acoustic Wave (SAW) filter.

In the system 20, the WCS filter 30 attenuates the satellite radio signals to some degree depending on how close there are in frequency to the WCS frequency band. Therefore, if the satellite radio signal is relatively weak, which may be caused by tree foliage, building, etc., the performance of the radio 22 may be reduced even in the absence of signals from the cellular tower 18 or the cellular device 28. In other words, in order for the filter 30 to be acceptable for rejecting the WCS signals, some of the satellite radio signals may be attenuated because of their frequency proximity to the WCS frequency band. Therefore, the present invention proposes to only switch in the WCS filter 30 in the presence of the WCS signals from the cellular tower 18.

Figure 3:
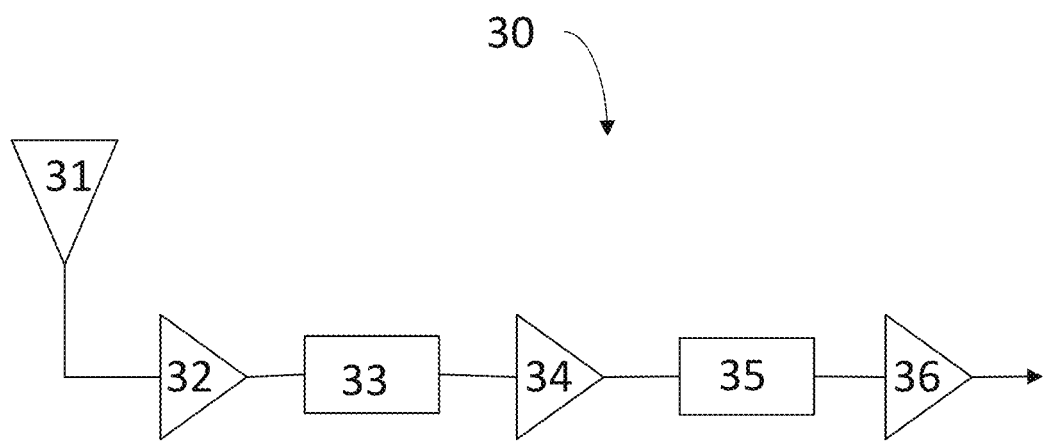
FIG. 3 is a block diagram of an exemplary antenna system and signal processing circuitry for receiving one of a plurality of adjacent band signals.

Turning now to FIG. 3 is a block diagram of an exemplary antenna system and signal processing circuitry for receiving one of a plurality of adjacent band signals. The desired signal, as well as other in band signals, are received at the antenna 31. In an exemplary automotive application, the antenna may be a patch antenna located on the surface of a vehicle, applied to a glass surface of a vehicle, and/or covered with a radome. The received signals are coupled from the antenna 31 to a first stage low noise amplifier (LNA) 32. The LNA 32 is used to amplify the received signals in the desired frequency band, and is especially useful when weak signals, such as satellite signals, are received.

In an exemplary embodiment, when a satellite radio signal is desired to be received, but there also exists a strong cellular signal in an adjacent frequency band, a reject filter 33 may be used to attenuate the stronger cellular signal while preserving the weaker satellite signal. The reject filter 33 may be a notch filter with a center frequency located at the center frequency of the cellular signal and ideally a bandwidth that covers the bandwidth of the cellular signal, but does not attenuate any signal within the bandwidth of the satellite signal.

The system may further include a second stage LNA 34 which is used to further amplify the XM signal. The second stage LNA 34 again amplifiers all signals in the band, but as a result of the reject filter 33, the cellular signal power is attenuated closer to that of the XM signal and therefore may not saturate the second stage LNA 34. The output of the second stage LNA 34 is coupled to a desired bandpass filter 35 which is operative to further attenuate the unwanted adjacent signals, such as the cellular signal. The output of the desired bandpass filter 35 may optionally be coupled to a third stage LNA 36 if required. The resultant signal is then coupled to a receiver for further signal processing.

Figure 4:
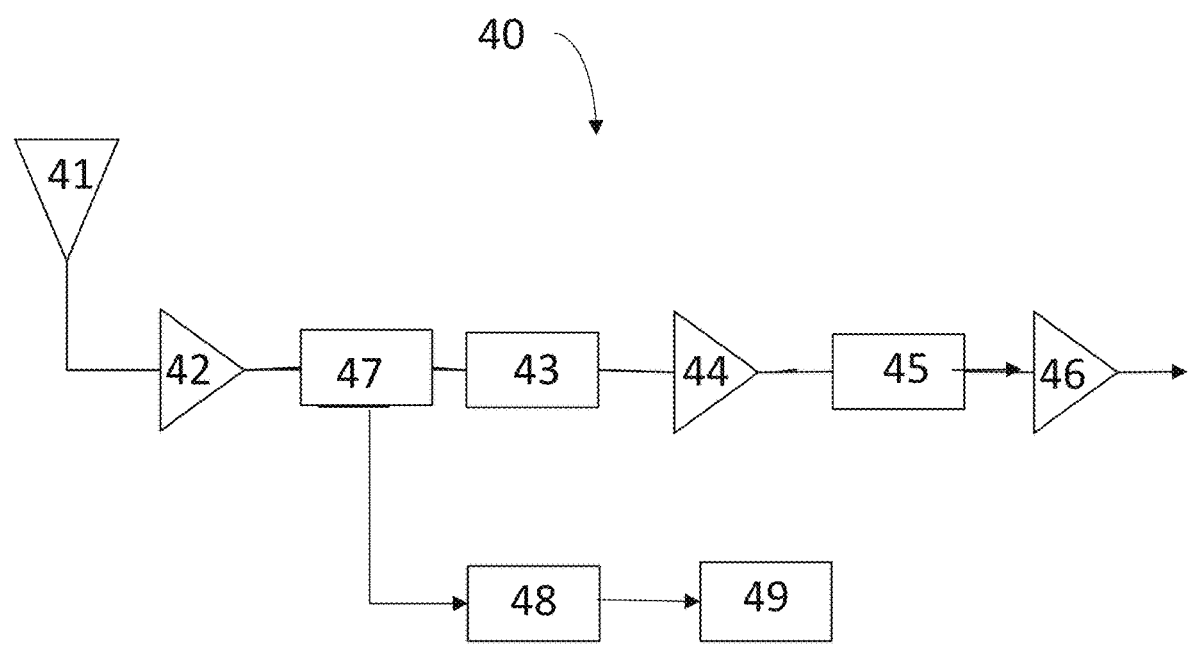
FIG. 4 is a block diagram of another exemplary antenna system and signal processing circuitry for receiving two adjacent band signals.

In an alternate embodiment, FIG. 4 shows a block diagram of another exemplary antenna system and signal processing circuitry for receiving two adjacent band signals. The first desired signal and the second desired signal are received at the antenna 41. The received signals are coupled from the antenna 41 to a first stage low noise amplifier (LNA) 42. The LNA 42 is used to amplify the received signals in the desired frequency band.

In this exemplary embodiment, the signal from the LNA is coupled to a coupler used to extract a portion of the received signals, which may be a high powered signal such as a B30 LTE signal and a low powered signal, such as a satellite radio signal. A coupler may be a 4 port radio frequency device which is use to receive a band of signals at a first input power and to couple a defined amount of the band of signals to a first output port and another defined amount of the band of signals to a second output port. For example, in a 10 dB coupler 10% of the input power is coupled to one port and 90% of the input power is coupled to the second port. In this exemplary embodiment, the high powered signal may be a B30 LTE signal and the low powered signal may be a satellite radio signal.

The coupler may be chosen such that the output power to the second port is optimized such that a B30 LTE band is at acceptable amplitude for processing without further amplification or filtering. In this exemplary embodiment, the satellite signal would be further conditioned in order to increase the amplitude and decrease the B30 LTE signal amplitude in order to process the satellite signal. The coupler output signal ratio may be automatically controlled in response to the amplitude of the B30 LTE signal at either the input of the coupler or at an output port of the coupler. Thus the B30 LTE signal may be coupled directly to a WCS signal processor without further conditioning.

The coupler 47 is used to separate the signals from the LNA 42 into a first processing path and a second processing path. The first processing path may be used to process the lower powered signal, such as the satellite radio signal. On the first signal processing path, a portion of the signals from the LNA 42 are coupled to a first band reject filter 43 that is configured to reject signals in the frequency range of the higher powered signal. In this exemplary embodiment, this may include signals in the B30 LTE band. A second portion of the signals from the LNA may be coupled to a second band reject filter 48, to remove the lower powered signal, such as the satellite radio signal.

On the first signal processing path, the signal that is coupled from the first band reject filter 43 may be further processed using a second LNA 44, a bandpass filter 45 configured to conduct the band of the desired signal, and optionally, a third LNA 46, and on to a first signal processor. On the second signal processing path, the signal coupled from the second band reject filter 48 may be coupled directly to a second signal processor 49.

The first processing path may further be used with a detector and directional coupler in order to select the B30 reject band filter when a B30 signal is present, or not to implement the filter when the B30 signal is not present.

Figure 5:
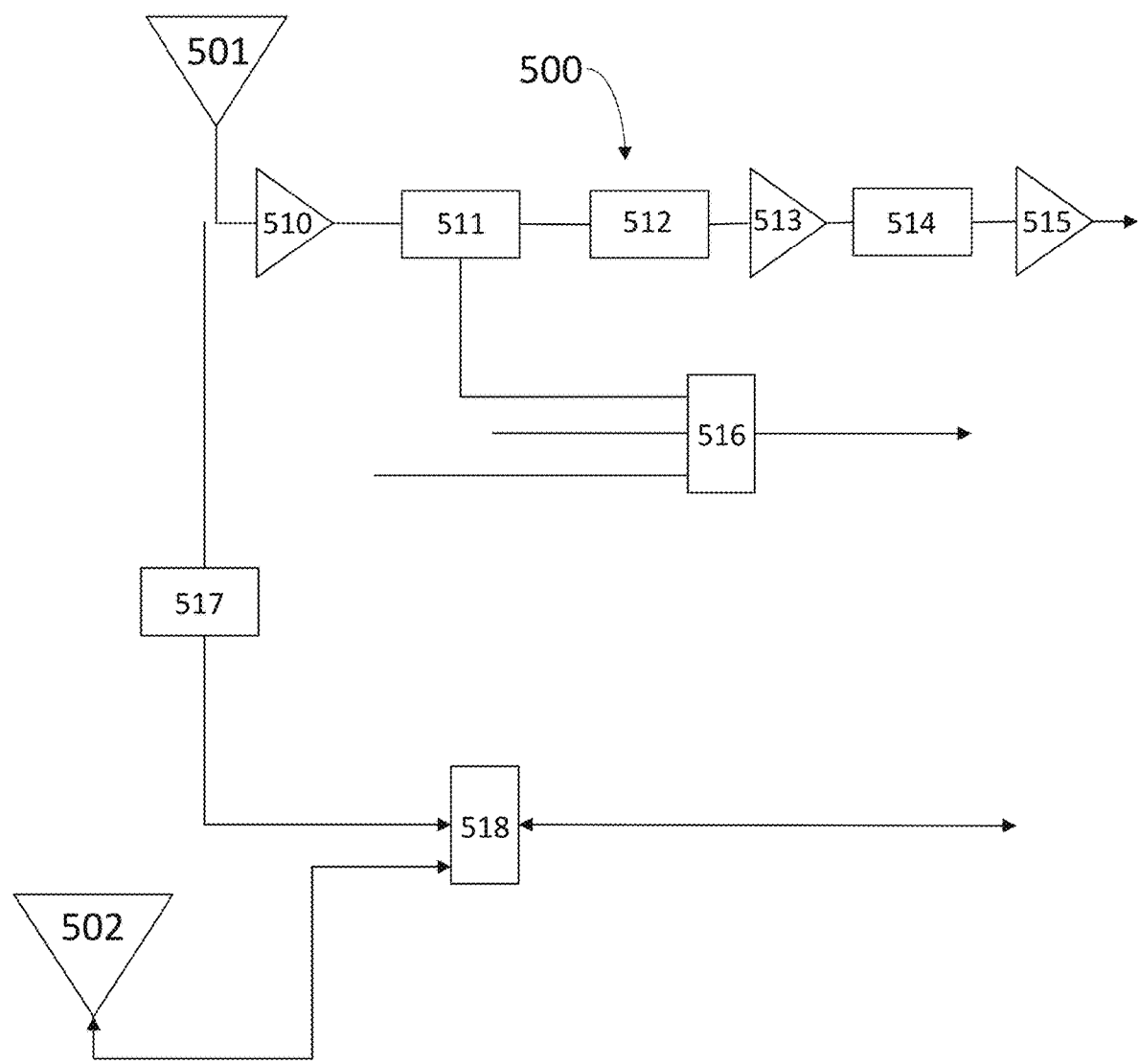
FIG. 5 is a block diagram of a multiple input, multiple output (MIMO) antenna and receiver system.

Turning now to FIG. 5, a multiple input, multiple output (MIMO) antenna and receiver system 500 is shown. In an exemplary embodiment, a first antenna 501, such as a patch antenna, is used to receive radio signals in a first frequency band, and a second antenna 502 is used to receive radio signal in a second frequency band. The first frequency band and the second frequency band may be partially overlapping or, in an exemplary embodiment, cover the same frequency band wherein the frequency band covers the frequency range of a first higher powered signal and a second lower powered signal.

The first antenna may be a patch antenna with a first feed point and a second feed point. The first feed point may be used to receive a signal for coupling to a first signal path and the second feed point may be used to receive a signal coupled to a second signal path. In an exemplary embodiment, a signal received at a first feed point of the first antenna 501 may be coupled to a first LNA 510 and then a first coupler 511. The first coupler 511 is used to divide the signal received at the first feed point into a first RF signal and a second RF signal. The first RF signal may be coupled to a first band reject filter 512 wherein the first band reject filter 512 is configured to reject a strong adjacent channel signal, such as a B30 LTE signal and to conduct a lower powered desired signal, such as a satellite radio signal. The lower powered desired signal may then be coupled to a second LNA 513, a bandpass filter 514 and, optionally, a third LNA 515. The bandpass filter may be configured to have a center frequency that is the same as the center frequency of the lower powered desired signal.

The second RF signal may include a first higher powered desired signal, wherein the second RF signal is coupled to a first combiner 516. The first combiner 516 may be used to combine the second RF signal with other received RF signals, such as a global positioning system signal, wireless network signal, near field communications signal, and/or a secondary cellular signal outside of the B30 band. These combined signals may then be coupled to a signal processor, such as a vehicular wireless access module processor.

The signal received at the second feed point of the first antenna 501 may be coupled to a filter 517, if required, and then fed to a second combiner 518. The second combiner may be used to combine the second RF signal, and a third RF signal received at the second antenna 502. The second antenna 502 maybe configured primarily for receiving cellular network communications. In this configuration, two independent cellular network signals maybe received and used to enable LTE MIMO operation.

Figure 6:
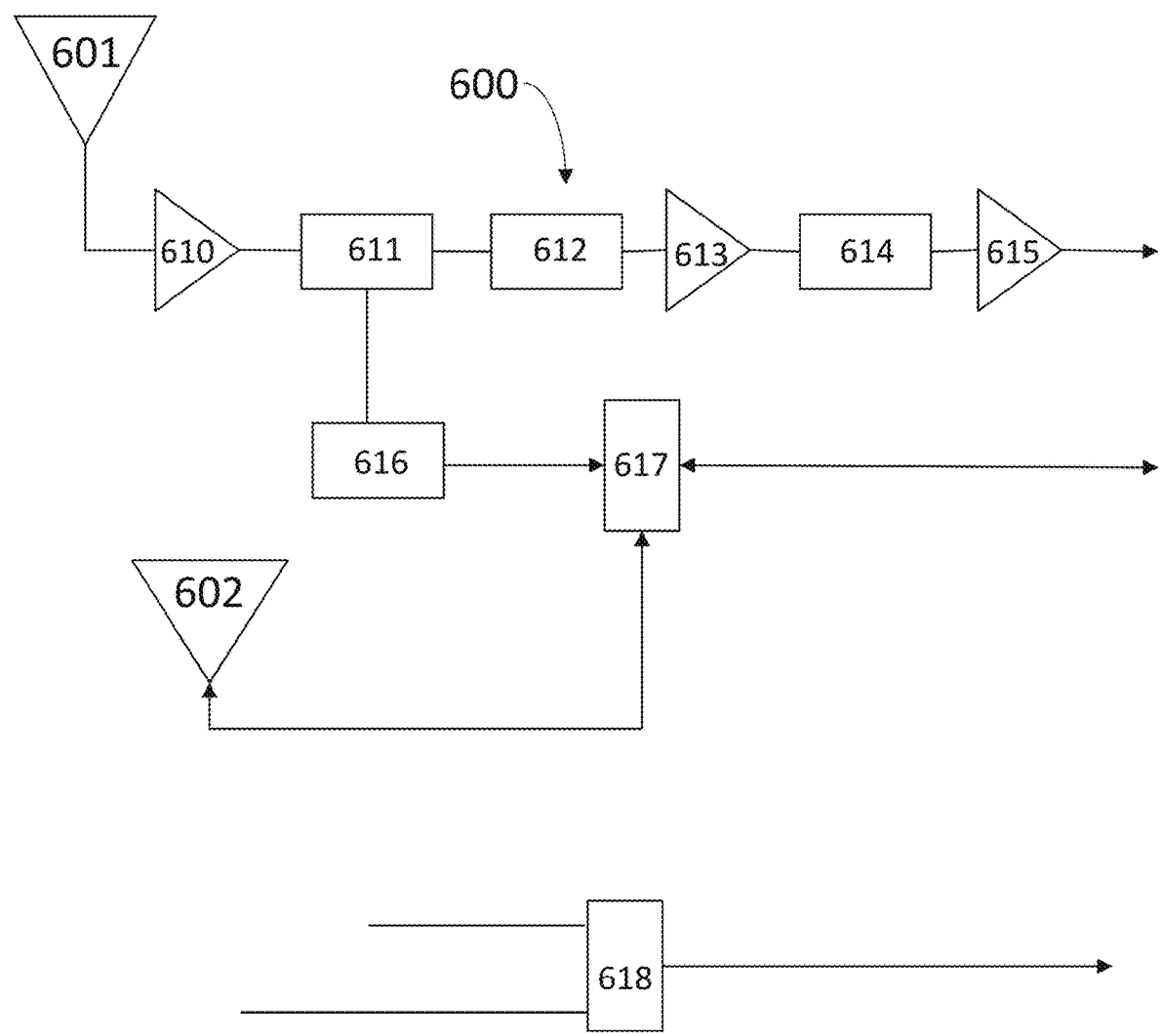
FIG. 6 is a block diagram of a second embodiment of a MIMO antenna and receiver embodiment.

Turning now to FIG. 6, a second MIMO antenna and receiver embodiment 600 is shown. For this exemplary embodiment a first antenna 601 and a second antenna 602 are used to each receive a first lower powered RF signal and a second higher powered RF signal. The signal received at the first antenna 601, which may be a patch antenna, is first coupled to a first LNA 610. The signal is then coupled to an RF coupler 611 which is used to divide the signal into a first divided RF signal and a second divided RF signal. The first divided RF signal is coupled to a first band reject filter 612 where a lower powered desired signal is conducted by the first band reject filter 612 to a second LNA 613, a bandpass filter 614 and, optionally, a third LNA 615. The lowered powered desired signal is then coupled to a signal processor or the like.

The second divided RF signal is then coupled from a second port of the coupler 611 to a second band reject filter 616 and then to a first combiner 617. The combiner is operative to combine the second divided RF signal and the RF signal received at the second antenna 602 and to couple the combined RF signals to a radio signal processor. A second combiner 618 may be used to combine a global positioning system signal with a secondary cell antenna signal for MIMO. This combined signal may then be coupled to a signal processor.

Figure 7:
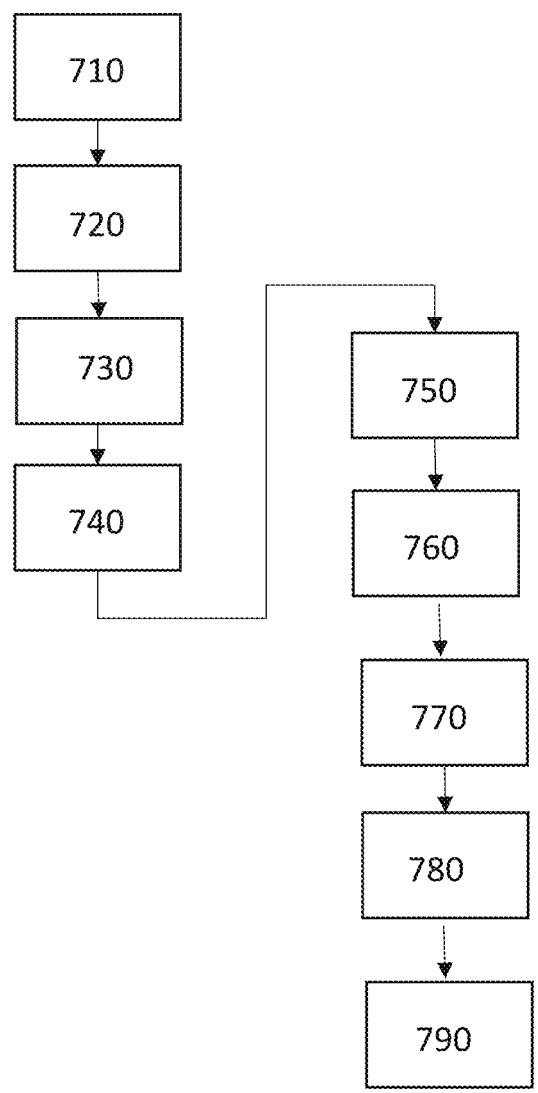
FIG. 7 is a flowchart illustrating a method for adjacent band RF signal reception.

Turning now to FIG. 7, a flowchart illustrating a method for adjacent band RF signal reception 700 is shown. The method is first operative to receive a combined RF signal 710 wherein the combined RF signal has a first higher powered signal and a second lower powered signal. The combined signal is then amplified 720 to generate an amplified signal in order to preserve the second lower powered signal during the coupling phase. The amplified signal is then divided into a first signal and a second signal 730. The first signal is filtered using a band reject filtering technique 740 to generate a filtered first signal in order to remove the first higher powered signal from the first signal and to preserve the second lower powered signal in the first signal. The filtered first signal is then amplified 750 to generate an amplified filtered first signal. The amplified filtered first signal is then filtered again using a notch filtering technique centered around the center frequency of the second lower powered signal 760 to generate a first desired signal. The first desired signal is then processed to extract digital data 770 which may include satellite data and/or satellite radio data. The second signal is then filtered using a notch filtering technique 780 to generate a second filtered signal wherein the second filtered signal may include cellular network data and/or terrestrial broadcast data. The second filtered signal is then processed using a signal processor 790.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method comprising:
   receiving a first signal and a second signal via a first antenna;
   amplifying the first signal and the second signal using a first amplifier;
   coupling a first portion of the first signal and the second signal to a filter wherein the filter is operative to reduce the amplitude of the second signal to generate a first filtered signal, wherein the coupling is performed by a radio frequency coupler, wherein the radio frequency coupler is a 4 port radio frequency device;
   amplifying the first filtered signal to generate an amplified first filtered signal using a second amplifier;
   processing the amplified first filtered signal to generate a first data signal; and
   coupling a second portion of the first signal and the second signal and processing the second portion to generate a second data signal.

2. The method of claim 1 wherein the second signal is a higher powered signal and the first signal is a lower powered signal.

3. The method of claim 1 wherein the bandwidth of the first signal partially overlaps the bandwidth of the second signal.

4. The method of claim 1 wherein the first signal and the second signal are adjacent channel signals.

5. The method of claim 1 wherein the first signal is a satellite signal and the second signal is a wireless communications service signal.

6. The method of claim 1 wherein the first signal has a higher amplitude than the second signal.

7. The method of claim 1 wherein further comprising filtering the amplified first filtered signal using a bandpass filter with a center frequency and frequency bandwidth corresponding to those of the first signal.

8. A signal processing apparatus comprising:
   an input for receiving a first signal and a second signal;
   a first amplifier for amplifying the first signal and the second signal;
   a signal coupler for decoupling a first portion of the first signal and the second signal to generate a first decoupled signal and a second portion of the first signal and the second signal second to generate a second decoupled signal, wherein the signal coupler is a 4 port radio frequency device;
   a filter to filter the first decoupled signal to reduce the amplitude of the portion of the second signal to generate a first filtered signal;
   an amplifier for amplifying the first filtered signal to generate an amplified first filtered signal;
   a first processor for processing the amplified first filtered signal to generate a first data signal; and
   a second processor for processing the second decoupled signal to generate a second data signal.

9. The signal processing apparatus of claim 8 wherein the second signal is a higher powered signal and the first signal is a lower powered signal.

10. The signal processing apparatus of claim 8 wherein the bandwidth of the first signal partially overlaps the bandwidth of the second signal.

11. The signal processing apparatus of claim 8 wherein the first signal and the second signal are adjacent channel signals.

12. The signal processing apparatus of claim 8 wherein the first signal is a satellite signal and the second signal is a wireless communications service signal.

13. The signal processing apparatus of claim 8 wherein the first decoupled signal has a greater amplitude than the second decoupled signal.

14. The signal processing apparatus of claim 8 comprising a notch filter having a center frequency and frequency bandwidth corresponding to those of the first decoupled signal.

15. An apparatus comprising:
   an antenna for receiving a satellite signal and a wireless communications signal;
   an first amplifier for amplifying the satellite signal and the wireless communications signal;
   a coupler for decoupling a first portion of the satellite signal and a first portion of the wireless communications signal to form a first signal, from a second portion of the satellite signal and a second portion of the wireless communications signal wherein the second portion of the satellite signal and the second portion of the wireless signal form a second signal, wherein the coupler is a 4 port radio frequency device;

a filter for filtering the first signal in order to reduce an amplitude of the first portion of the wireless communications signal;

a second amplifier for amplifying the first signal in order to increase the amplitude of the first portion of the satellite signal, a first processor for processing the first portion of the satellite signal to generate a first data signal; and a second processor for processing the second portion of the wireless communications signal to generate a second data signal.

16. The apparatus of claim 15 wherein the bandwidth of the satellite signal partially overlaps the bandwidth of the wireless communications signal.

17. The apparatus of claim 15 wherein the bandwidth of the satellite signal is adjacent with the bandwidth of the wireless communications signal.

18. The apparatus of claim 15 wherein the wireless communications signal has a greater amplitude than the satellite signal.

19. The apparatus of claim 15 wherein the antenna is a patch antenna.

* * * * *